(12) United States Patent
Lee et al.

(10) Patent No.: US 12,333,836 B2
(45) Date of Patent: Jun. 17, 2025

(54) FONT DETECTION METHOD AND SYSTEM USING ARTIFICIAL INTELLIGENCE-TRAINED NEURAL NETWORK

(71) Applicant: EEUM, Inc, Seoul (KR)

(72) Inventors: Hyuk Lee, Seoul (KR); Hyun Jin Yun, Seoul (KR); Dong Hyuk Park, Seoul (KR); Il Guen Seo, Seoul (KR); Seung Hyun Kim, Seoul (KR)

(73) Assignee: EEUM, INC, Seoul (KR)

( * ) Notice: Subject to any disclaimer, the term of this patent is extended or adjusted under 35 U.S.C. 154(b) by 457 days.

(21) Appl. No.: 17/833,010

(22) Filed: Jun. 6, 2022

(65) Prior Publication Data
US 2022/0392241 A1    Dec. 8, 2022

(30) Foreign Application Priority Data

Jun. 8, 2021 (KR) .................. 10-2021-0074288
Jan. 5, 2022 (KR) .................. 10-2022-0001799

(51) Int. Cl.
*G06V 30/18* (2022.01)
*G06V 10/82* (2022.01)
(Continued)

(52) U.S. Cl.
CPC ........ *G06V 30/18162* (2022.01); *G06V 10/82* (2022.01); *G06V 30/1444* (2022.01);
(Continued)

(58) Field of Classification Search
CPC ............. G06V 30/18162; G06V 10/82; G06V 30/1444; G06V 30/166; G06V 30/245; G06V 30/287; G06V 30/28
See application file for complete search history.

(56) References Cited

U.S. PATENT DOCUMENTS 11,823,471 B2 * 11/2023 Hu .................. G06V 30/19147
2019/0147304 A1   5/2019 Liu et al.

FOREIGN PATENT DOCUMENTS

CN    109800754 A    5/2019
CN    110807823 A    2/2020
(Continued)

OTHER PUBLICATIONS

Office Action dated Jun. 26, 2024, issued in counterpart Korean patent application No. 10-2022-0001799 with English translation (9 pages).
(Continued)

*Primary Examiner* — Diane D Mizrahi
(74) *Attorney, Agent, or Firm* — WHDA, LLP

(57) ABSTRACT

The present disclosure relates to a font detection method using a neural network. The font detection method using the neural network according to the present disclosure includes receiving a target text image including a text; resizing a horizontal or vertical size to a reference input size according to an aspect ratio of the input target text image; and inputting the resized target text image into a trained neural network and outputting a font of the text included in the text image, and the neural network may be trained with a unit image extracted as a unit region of the reference input size from a training image generated by synthesizing a background with the text. According to the present disclosure, fonts according to various usage examples may be effectively detected.

12 Claims, 10 Drawing Sheets

(51) Int. Cl.
*G06V 30/14* (2022.01)
*G06V 30/166* (2022.01)
*G06V 30/244* (2022.01)
*G06V 30/28* (2022.01)

(52) U.S. Cl.
CPC .......... *G06V 30/166* (2022.01); *G06V 30/245* (2022.01); *G06V 30/287* (2022.01)

(56) References Cited

FOREIGN PATENT DOCUMENTS

| KR | 10-2015-0091948 A | 8/2015 |
| KR | 10-2019-0095651 A | 8/2019 |
| KR | 10-2043693 B1 | 11/2019 |

OTHER PUBLICATIONS

Pieere Joseph Delorme, "Image Processing," https://medium.com/unpackai/image-preprocessing-6654d1bb4daa, published in unpack, May 18, 2021 (14 pages).

He Zhang et al., "Deep Image Compositing," arXiv:2011.02146v1 [cs. CV], Nov. 4, 2020 (10 pages).

\* cited by examiner

FONT DETECTION METHOD AND SYSTEM USING ARTIFICIAL INTELLIGENCE-TRAINED NEURAL NETWORK

TECHNICAL FIELD

The present disclosure relates to a font detection method using artificial intelligence.

BACKGROUND ART

A font refers to a style of a letter, and is an expression produced to obtain a specific result so that the outline of a typeface of a specific style may be printed repeatedly and conveniently by adjusting the size, length, thickness, and inclination, etc., and is protected by copyright.

A font file is an electronic data file created for the purpose of displaying and outputting the font on the screen of a digital device, and is mainly developed in the form of True Type Font (TTF) which is a font storage format created by Microsoft and Apple in the 1980s, and OpenType Font (OTF) created by combining with Adobe Systems.

These fonts are rendered according to formats and have various irregular curved styles, but their unique styles may be distorted or deformed depending on a geometrical change in the size or background in which the font is used.

Therefore, it is difficult to identify the font used only by an image itself in which the font is used.

With the recent development of artificial intelligence technology, various artificial intelligence algorithms are being used for object detection or classification using a trained neural network. The performance of artificial intelligence is greatly affected by features of training data used for training as well as an internal structure of the neural network.

Accordingly, a detection method using a neural network has been devised in the field related to font detection (Prior Patent: Japanese Patent Application Laid-Open No. 2019-091434 (published on Jun. 13, 2019))

DISCLOSURE

Technical Problem

An object of the present disclosure is to propose a method for font detection.

Another object of the present disclosure is to propose a method of detecting a font using a neural network trained to have adaptive performance according to various usage examples of the font.

Another object of the present disclosure is to propose a method of preprocessing input data for font detection and a method of effectively detecting various fonts through the same.

Technical Solution

According to an exemplary embodiment of the present disclosure, a font detection method using a neural network includes receiving a target text image including a text; resizing a horizontal or vertical size to a reference input size according to an aspect ratio of the input target text image; and inputting the resized target text image into a trained neural network and outputting a font of the text included in the text image.

The neural network may be trained with a unit image extracted as a unit region of the reference input size from a training image generated by synthesizing a background with the text.

The receiving may include extracting a region including the text from an uploaded image by user and receiving the extracted region of the uploaded image as the text image.

The receiving may include extracting a region of the text from an arbitrary web page including the text on a web and receiving the extracted region of the web page as the text image.

The neural network may be trained by resizing the horizontal or vertical size to the reference input size according to the aspect ratio of the training image, and extracting a square unit image of the reference input size from the resized training image.

The outputting of the font may include extracting feature information from the target text image input to the neural network by performing a convolution operation through a filter of a predetermined size; extracting a representative feature for each channel by which the extracted feature information is defined; and extracting corresponding font category information from the extracted representative feature.

The receiving may include receiving a plurality of target text images in a batch unit, and the resizing may include padding a region of another image with a blank with respect to an image having a largest size resized according to the reference size among the plurality of images.

The neural network may dynamically set a condition for giving an effect to the text or a condition for synthesizing a background according to a training result through a training data set including an image including a text created in an arbitrary font and the background, and the font used.

According to another exemplary embodiment of the present disclosure, a font detection device using a neural network includes a text input unit receiving a target text image including text; a resizing unit resizing a horizontal or vertical size to a reference input size according to an aspect ratio of the input target text image; and a font output unit inputting the resized target text image into a trained neural network and outputting a font of the text included in the text image, and the neural network may be trained with a unit image extracted as a unit region of the reference input size from a training image generated by synthesizing a background with the text.

The neural network may include a feature extraction unit extracting feature information from the target text image input to the neural network by performing a convolution operation through a filter of a predetermined size; a feature representation unit extracting a representative feature for each channel by which the extracted feature information is defined; and a font categorization unit extracting corresponding font category information from the extracted representative feature.

The neural network may dynamically set a condition for giving an effect to the text or a condition for synthesizing a background according to a training result through a training data set including an image including a text created in an arbitrary font and the background, and the font used.

The text input unit may receive a plurality of target text images in a batch unit, and the resizing unit may perform padding on a region of another image with a blank with respect to an image having a largest size resized according to the reference size among the plurality of images.

Advantageous Effects

According to the various exemplary embodiments of the present disclosure, the font may be effectively detected according to various usage examples.

In addition, the font may be effectively detected without restrictions on the color or size of the font used.

In addition, the present disclosure may enable inference in a batch unit, thereby effectively determining the font used from various font usage examples.

In addition, the present disclosure may determine whether the subject and purpose of the detected font are within the scope of copyright, thereby preventing unauthorized usage.

BEST MODE

The following description illustrates only a principle of the present disclosure. Therefore, those skilled in the art may invent various devices that implement the principle of the present disclosure and are included in the spirit and scope of the present disclosure although they are not clearly described or shown in the present specification. In addition, it is to be understood that all conditional terms and exemplary embodiments listed in the present specification are obviously intended only to allow those skilled in the art to understand a concept of the present disclosure in principle, and the present disclosure is not limited to the exemplary embodiments and states particularly listed as described above.

The above-mentioned objects, features, and advantages will become more obvious from the following detailed description provided in relation to the accompanying drawings. Therefore, those skilled in the art to which the present disclosure pertains may easily practice a technical idea of the present disclosure.

Further, in describing the present disclosure, in the case in which it is determined that a detailed description of a known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
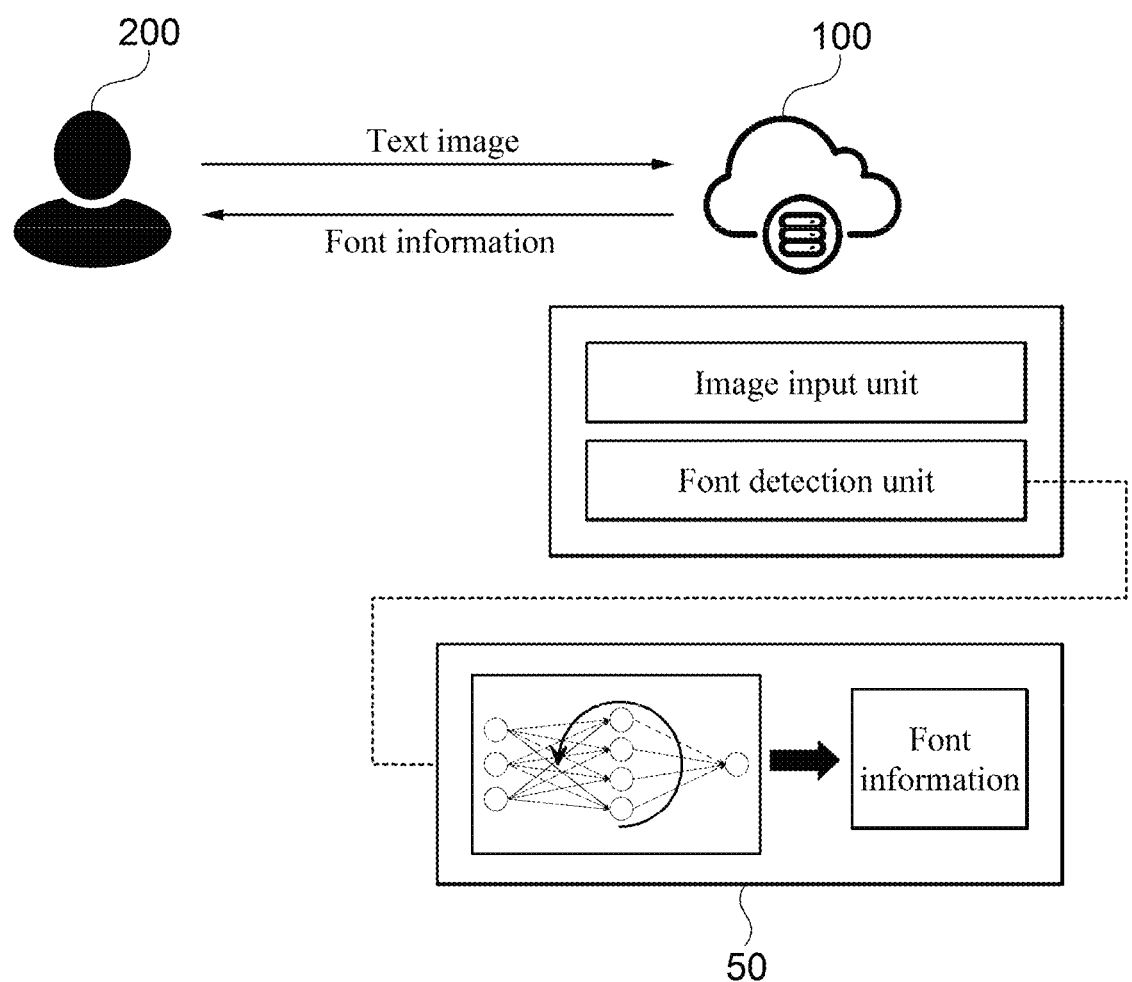
FIGS. 1 and 2 are exemplary views showing a font detection system according to an embodiment of the present disclosure.

FIG. 1 is a diagram illustrating a neural network-based font detection system according to an embodiment of the present disclosure.

The system according to an embodiment of the present disclosure may include a font detection device 100 performing font detection and a user 200 inputting a text image including a font to be detected.

The user 200 may input the text image by accessing a web page on the web operated by the font detection device 100 or installing an application in a user terminal, uploading an image, or directly photographing the image through a camera operating in conjunction with the application.

When the image is input from the user 200, an image input unit of the font detection device 100 transmits the text image to a font detection unit that extracts a font of a text using a neural network 50 to detect the font. Font information detected through the above process is provided to a user so that the user may confirm the font in which the text included in the image is written.

In addition, in the present embodiment, a detection service of the font detection device 100 may be provided as a server in the form of capturing a plurality of pieces of information on the web or dynamically collecting the same through a method such as crawling and detecting the font.

Figure 2:
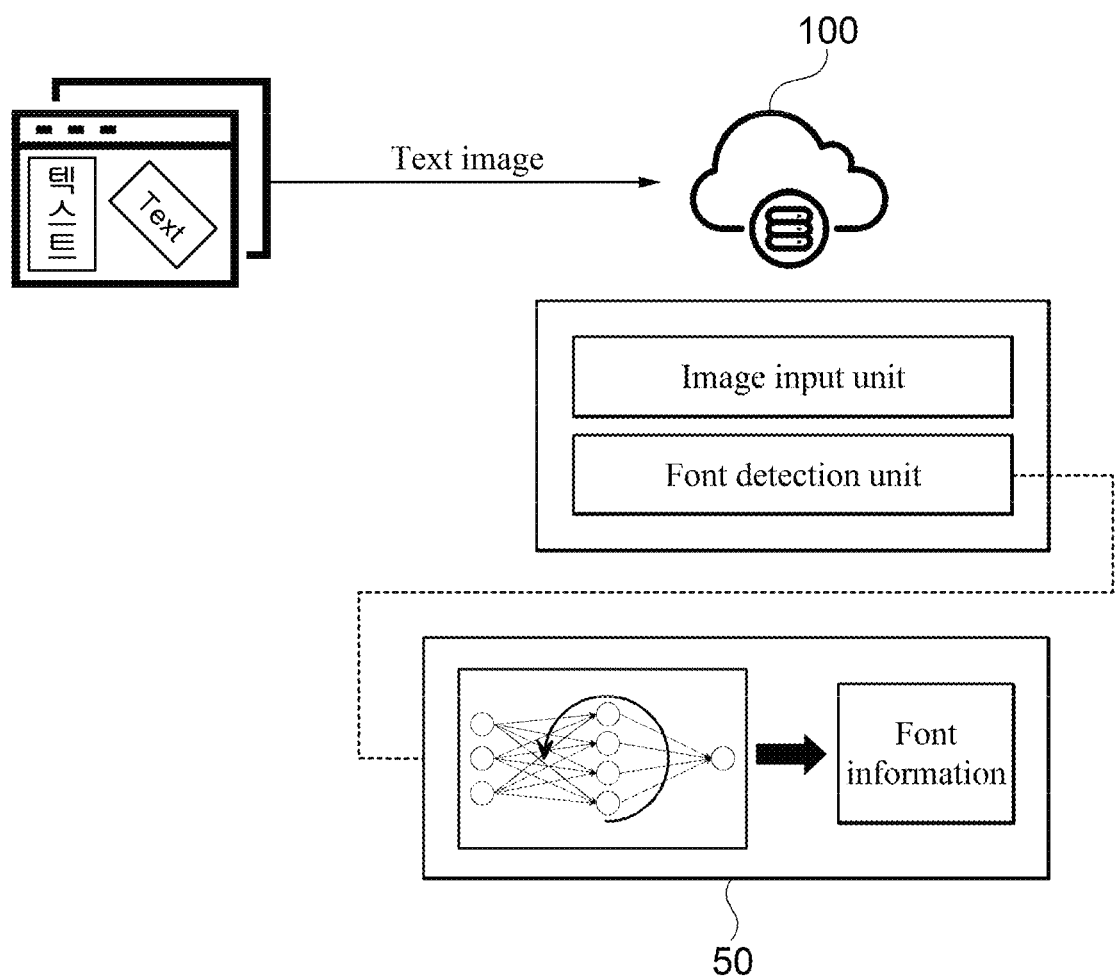

Referring to FIG. 2, the font detection device 100 may collect various text images included in the web page by directly searching for and collecting the web page instead of a user's intentional input of the text image.

A font is an expression on a computer that is produced to repeatedly and conveniently edit and output a typeface of a specific style on the computer and may be protected by copyright. And thus, the font detection device 100 may automatically detect the font through the text image collected through a network to additionally determine whether the used font is used according to the scope of copyright and provide the same to the user.

Accordingly, when performing the above function, the image input unit of the font detection device 100 may collect various images in which a text is used, by randomly visiting a website or searching for an image, instead of directly receiving input of an image. When the images are collected, the font detection unit may detect the font of the text included in the collected images by using the neural network 50, and compare a usage case with the scope of copyright granted to a subject using the font to determine whether the copyright is violated.

For example, the font detection unit may confirm that the font used in the collected images is used for commercial purposes such as a specific shopping web site through a source of the image, and, when there is no license fact for a subject using the copyright for the corresponding font, may determine this as a copyright violation.

Figure 3:
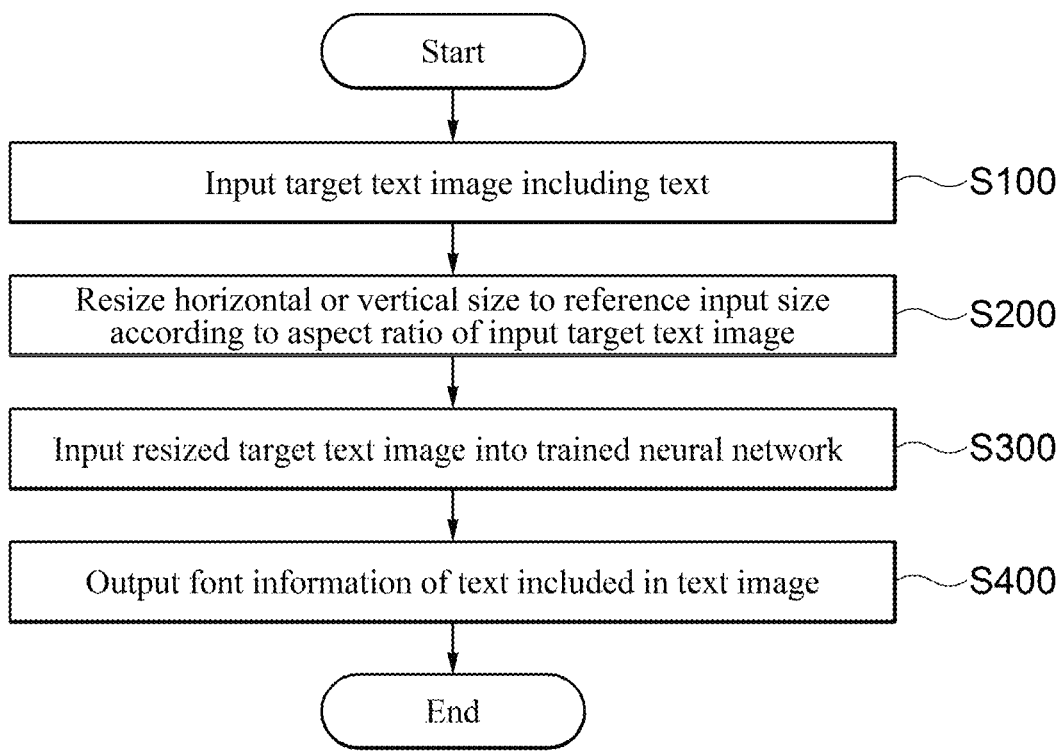
FIG. 3 is a flowchart illustrating a font detection method using a neural network according to an embodiment of the present disclosure.

Hereinafter, a font detection method using a neural network according to the present embodiment will be described with reference to FIG. 3.

First, a target text image including a text is input (S100).

As described above, the target text image includes text that satisfies the minimum length so that the font may be detected as an image including at least one character.

In this regard, to input the text image, it is also possible to perform a text detection process by using a trained neural network.

That is, the text image including the text may be extracted from the entire image by using a neural network trained to detect a text region in which the text exists with respect to the entire image. The neural network may be trained to output a boundary line defining the text and the text region or bounding box coordinates x, y, w, h information, and may generate the text image by cutting (cropping) the corresponding text region within the entire image according to an output result.

Next, the font detection method according to the present embodiment resizes a horizontal or vertical size to a reference input size according to an aspect ratio of the input detection target text image.

In the present embodiment, for resizing, the size of the text image is preferably divided into two categories according to the aspect ratio of the text image, and the resizing size is adjusted according to the corresponding categories.

Figure 4:
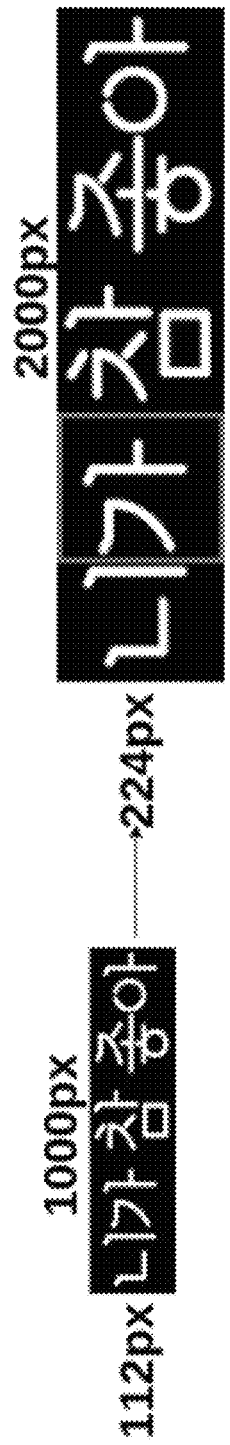
FIGS. 4 and 5 are exemplary views showing preprocessing for input of a neural network according to an embodiment of the present disclosure.
Figure 5:
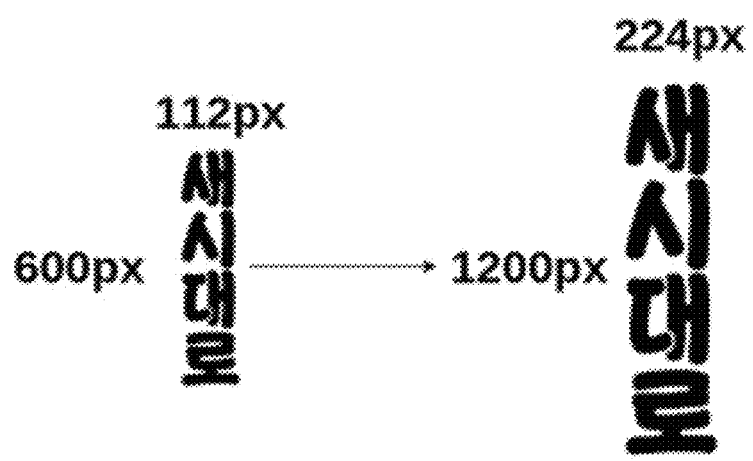

In this regard, referring to FIGS. 4 and 5, when the text image has a long horizontal length in a first category, a vertical length of the text image is changed to the reference size, but the text image is resized so that the aspect ratio is maintained. For example, a horizontally long text '내가 참 좋아 (I really like you (meaning in English))' may be resized so that the overall aspect ratio is maintained by adjusting the vertical length to 224 pixels.

Alternatively, when the text image has a long vertical length in a second category, the size of the text image may be changed based on the horizontal length as shown in FIG. 5, and in this regard, the text image is resized so that the aspect ratio of the original image is maintained.

In the case of FIG. 5, a vertically long text '새시대로 (to new era (meaning in English))' is resized so that the horizontal length is set to 224 pixels.

At this time, the horizontal and vertical lengths are determined based on whether the text proceeds horizontally or vertically, not horizontal and vertical shapes on a two-dimensional plane of the extracted text image, a type whether the text proceeds horizontally or vertically is divided into horizontal writing and vertical writing, and resizing is performed to set the length of a relatively short one to the reference size.

In addition, in the present embodiment, the reference size as a reference for resizing may be determined to correspond to the size of training data of the neural network trained to detect the font.

That is, in the present embodiment, the neural network may perform training by resizing the horizontal or vertical size of a training image to the reference input size according to the aspect ratio of the training image in a similar manner in the training process before inference. Furthermore, the neural network arbitrarily extracts a unit image including one character from the image resized based on the horizontal or vertical size after resizing and uses the same for learning.

Figure 6:
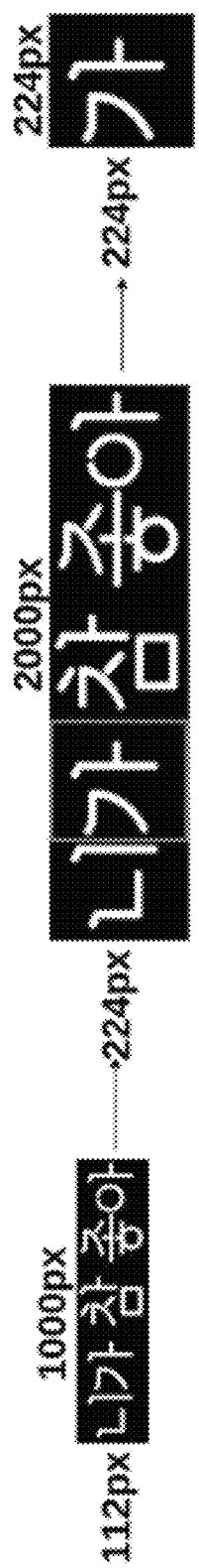
FIG. 6 is an exemplary view showing input preprocessing for training of a neural network according to an embodiment of the present disclosure.

Referring to FIG. 6, when an image with the size of 1000 pixels×112 pixels including the text '내가 참 좋아' is used as a training image before inference, in the present embodiment, the neural network randomly extracts a 224 pixel×224 pixel unit image '가' of one character size, which is a unit of learning, with respect to the image in which the vertical size of the text image is resized to 224 pixels, which is the reference size, and uses the same for learning.

Through this, the neural network may be trained by extracting features of each character randomly extracted in the text image, and in the case of the same font, filters of an inner layer may be trained so that common features of various characters may be emphasized.

On the other hand, unlike learning, since the entire text is a detection target in the case of inference, it is necessary to preprocess an inference target image so that features of a stroke composition of the font may be extracted in the same manner as for one character with respect to the entire text. Therefore, the font detection method according to the present embodiment may resize the short one of the text image to the reference size (for example, 224 px), thereby extracting features of the text including characters of a similar size to that of the characters in the text image when performing learning.

As described above, the font detection method according to the present embodiment may make at least the horizontal or vertical length of the image for font detection (inference) equal to the reference input size of the training image, so that the filters used for training may also extract the features of the font in the detection process equally.

Hereinafter, a structure of the neural network according to the present embodiment will be described in more detail with reference to FIG. 7.

Figure 7:
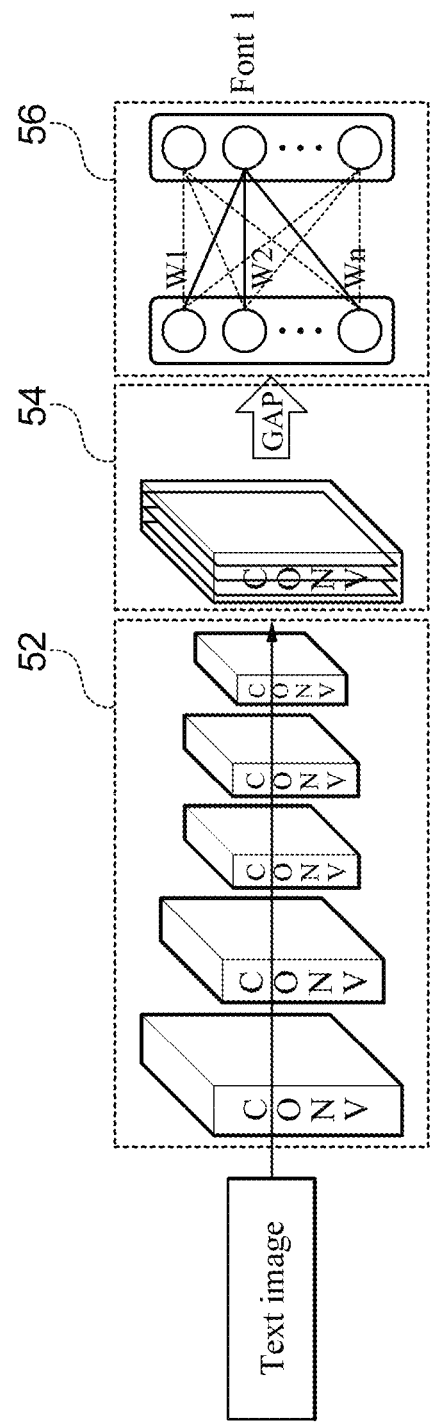
FIG. 7 is an exemplary view showing a neural network model according to an embodiment of the present disclosure.

Referring to FIG. 7, the neural network according to the present embodiment may include a convolution layer 52 that extracts features through a convolution operation on an input image, a pooling layer 54 that extracts a value representing a feature for each channel with respect to an extracted feature map, and a fully connected layer 56 that outputs a probability for each category through an output of the pooling layer.

As described above, in the present embodiment, the size of the image of the training data and the text image for actual inference are different. However, in the case of a convolution operation, filters perform the convolution operation according to the size of an internal kernel regardless of the size of input data and extract feature information of a compressed size.

However, for final categorization, the number of dimensions of the generated feature map may be adjusted according to the size of an input node of the fully connected layer.

That is, in the present embodiment, since the filters inside the convolution layer perform the convolution operation by inputting a text image set to any one of the horizontal or vertical sizes defining the size of the image used for learning, the size of the extracted feature map may be larger than the output of the training process, and thus it is necessary to adjust the size of an output value for final categorization.

Therefore, in the present embodiment, a global average pooling (GAP) layer may be configured between the convolution layer and the fully connected layer that performs categorization, and through this, a last feature map extracted from the convolution layer may be used as a unit feature map for each channel and vectorized as an average value of each feature map.

Through this, even when a relatively long text image is input compared to the training process, the neural network may emphasize the same features and average the features extracted from several characters and transmit the same to the fully connected layer, thereby outputting more accurate font detection results.

In addition, in the present embodiment, it is also possible to infer a set of text images in a batch unit instead of one text image.

In this regard, it is necessary to normalize the image size of the input data for consistent inference, and as described above, the horizontal or vertical length of the image size is normalized to the reference size used for learning.

In other words, in order to infer in a batch unit, it is necessary to unify the horizontal and vertical sizes of input images within a batch. First, in the same manner as in the case of inference of the text image described above, the length of each image is set to a unit length with respect to the shorter one of the horizontal or vertical length of each image, and the image is resized. Subsequently, a blank of the remaining images may be padded by setting the horizontal or vertical length other than a direction set to the unit length to an image with the longest length among images within the batch. In this regard, the influence on the feature of the stroke of the font may be minimized by setting the padded blank of the image to a background color of the text or an inverted color (e.g., a black color of the normalized text background) of a text color.

Figure 8:
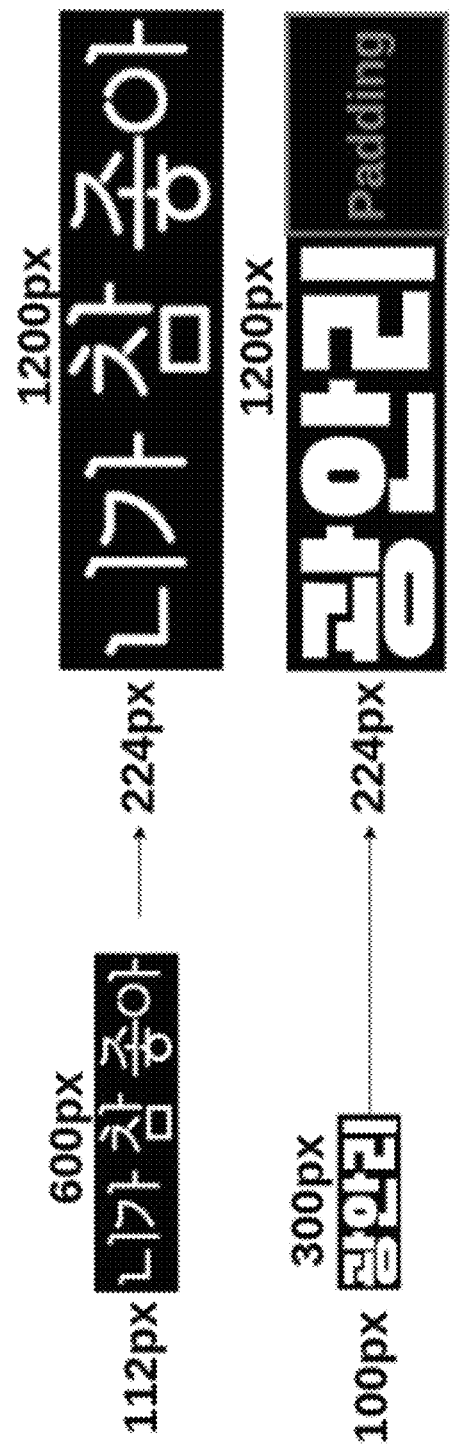
FIG. 8 is an exemplary view showing preprocessing for input of a neural network according to an embodiment of the present disclosure.

Referring to FIG. 8, in order to infer the text image '니가 참 좋아' and the text '광안리 (Gwanganli (meaning in English))', resizing is performed by setting the vertical length to the unit length, and in the case of the text image '광안리' with a relatively short length, the size of the images within the batch may be unified by padding the remaining region with a black color corresponding to the background color.

In the case of inference in a batch unit above, all sizes of the input images are normalized and input to the neural network and thus results are output.

Furthermore, in the present embodiment, the neural network performs training in unit of one character from an image with a text randomly generated to have robust performance for various font usage examples but may dynamically set conditions for generating text images, which are training data, using the training result.

Figure 9:
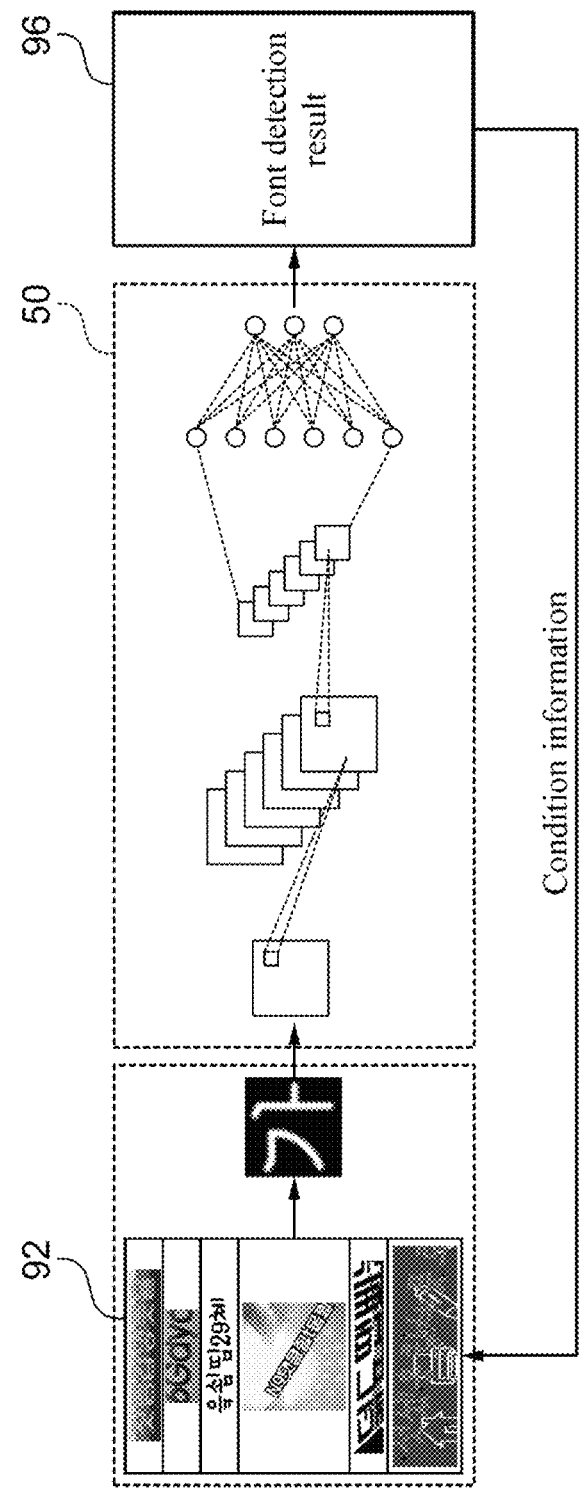
FIG. 9 is an exemplary view showing a training process of a neural network according to an embodiment of the present disclosure.

Referring to FIG. 9, the unit image extracted from the generated training data set 92 is input to the neural network 50, and the neural network 50 outputs a font detection result 96. The neural network 50 is trained to reduce an error between the font detection result and a correct answer value. In this regard, the neural network 50 may dynamically adjust the conditions for generating the training data, in addition to changing a weight of the inner layer during the training process.

There is a probability given to the text or background in the generated text image 92 of FIG. 9 for each of various effects (font color, size, outline, thickness, position, etc.) The training effect of the neural network may increase by adjusting the probability according to the training result.

Figure 10:
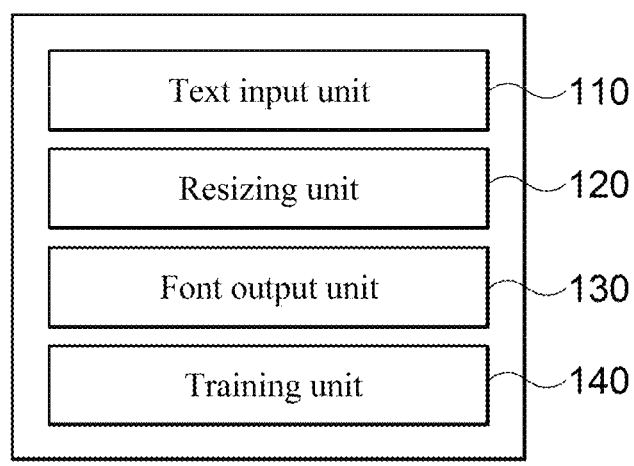
FIG. 10 is a block diagram showing a configuration of a font detection device through a neural network according to an embodiment of the present disclosure.

Hereinafter, the font detection device 100 according to the present embodiment will be described in more detail with reference to FIG. 10.

The font detection device 100 according to the present embodiment may include a text input unit 110, a resizing unit 120, a font output unit 130, and a training unit 140.

The text input unit 110 may receive a text image to be inferred from a user, or collect and receive images of various web pages in which a text is used through a web search.

Next, the resizing unit 120 adjusts the size of the text image for input of a neural network. Preferably, the resizing unit 120 may adjust the text image with respect to the size of a unit image used for training of the neural network, so that filters of internal layers of the trained neural network may extract the same features.

Also, when training is performed in a batch unit, the resizing unit 120 adjusts the overall image size by padding a blank with a region such as a black color in the case of a text having a relatively small number of characters in order to match the sizes of text images within a batch.

The text image adjusted through the above process is input to the font output unit 130, and the neural network of the font output unit 130 extracts and outputs font information included in the text image.

The training unit 140 trains the neural network, and it is also possible to train the neural network by receiving user feedback on an output result of the above-described inference process.

In addition, in the present embodiment, the neural network may further enhance the training effect by setting condition variables necessary for generating training data in a training process.

As described above, according to the present disclosure, fonts according to various usage examples may be effectively detected.

In addition, the font may be effectively detected without restrictions on the color or size of the font used.

In addition, the present disclosure may enable inference in a batch unit, thereby effectively determining the font used from various font usage examples.

In addition, the present disclosure may determine whether a subject using the detected font and purpose are within the scope of copyright, thereby preventing unauthorized use.

Furthermore, various embodiments described herein may be implemented in a recording medium readable by a computer or a similar device using, for example, software, hardware, or a combination thereof.

According to a hardware implementation, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the exemplary embodiments described in the present specification may be implemented by a control module itself.

According to a software implementation, the exemplary embodiments such as procedures and functions described in the present specification may be implemented as separate software modules. Each of the software modules may perform one or more functions and operations described in the present specification. Software code may be implemented in software applications written in a suitable programming language. The software code may be stored in a memory module and may be executed by the control module.

The above description is merely illustrative of the technical idea of the present disclosure, and various modifications, changes, and substitutions may be made by those skilled in the art without departing from the essential features of the present disclosure.

Accordingly, the exemplary embodiments disclosed in the present disclosure and the accompanying drawings are not intended to limit the technical idea of the present disclosure but to describe the present disclosure, and the scope of the technical idea of the present disclosure is not limited by the exemplary embodiments and the accompanying drawings. The protection scope of the present disclosure should be interpreted by the following claims, and all technical ideas within the equivalent scope should be interpreted as being included in the scope of the present disclosure.

The invention claimed is:

1. A font detection method using a neural network, the font detection method comprising:
    receiving a target text image including a text;
    resizing a horizontal or vertical size to a reference input size according to an aspect ratio of the input target text image; and
    inputting the resized target text image into a trained neural network and outputting a font of the text included in the text image, wherein the neural network is trained with a unit image extracted as a unit region of the reference input size from a training image generated by synthesizing a background with the text, and wherein the neural network comprises a convolution layer that extracts features through a convolution operation on the input target text image, a pooling layer that extracts a value representing a feature for each channel with respect to an extracted feature map, and a fully connected layer that outputs a probability for each category through an output of the pooling layer.

2. The font detection method of claim 1, wherein the receiving includes extracting a region including the text from an uploaded image by user and receiving the extracted region of the uploaded image as the text image.

3. The font detection method of claim 1, wherein the receiving includes extracting a region of the text from an arbitrary web page including the text on a web and receiving the extracted region of the web page as the text image.

4. The font detection method of claim 1, wherein the neural network is trained by resizing the horizontal or vertical size to the reference input size according to the aspect ratio of the training image, and extracting a square unit image of the reference input size from the resized training image.

5. The font detection method of claim 1, wherein the outputting of the font includes
extracting feature information from the target text image input to the neural network by performing a convolution operation through a filter of a predetermined size;
extracting a representative feature for each channel by which the extracted feature information is defined; and
extracting corresponding font category information from the extracted representative feature.

6. The font detection method of claim 1,
wherein the receiving includes receiving a plurality of target text images in a batch unit, and
wherein the resizing includes padding a region of another image with a blank with respect to an image having a largest size resized according to the reference size among the plurality of images.

7. The font detection method of claim 1, wherein the neural network dynamically sets a condition for giving an effect to the text or a condition for synthesizing a background according to a training result through a training data set including an image including a text created in an arbitrary font and the background, and the font used.

8. A non-transitory computer-readable recording medium having stored thereon a program for performing the font detection method using the neural network according to claim 1.

9. A font detection device using a neural network, the font detection device comprising:
a text input unit receiving a target text image including text;
a resizing unit resizing a horizontal or vertical size to a reference input size according to an aspect ratio of the input target text image; and
a font output unit inputting the resized target text image into a trained neural network and outputting a font of the text included in the text image,
wherein the neural network is trained with a unit image extracted as a unit region of the reference input size from a training image generated by synthesizing a background with the text, and
wherein the neural network comprises a convolution layer that extracts features through a convolution operation on the input target text image, a pooling layer that extracts a value representing a feature for each channel with respect to an extracted feature map, and a fully connected layer that outputs a probability for each category through an output of the pooling layer.

10. The font detection device of claim 9, wherein the neural network includes
a feature extraction unit extracting feature information from the target text image input to the neural network by performing a convolution operation through a filter of a predetermined size;
a feature representation unit extracting a representative feature for each channel by which the extracted feature information is defined; and
a font categorization unit extracting corresponding font category information from the extracted representative feature.

11. The font detection device of claim 10, wherein the neural network dynamically sets a condition for giving an effect to the text or a condition for synthesizing a background according to a training result through a training data set including an image including a text created in an arbitrary font and the background, and the font used.

12. The font detection device of claim 9,
wherein the text input unit receives a plurality of target text images in a batch unit, and
wherein the resizing unit performs padding on a region of another image with a blank with respect to an image having a largest size resized according to the reference size among the plurality of images.

* * * * *